United States Patent [19]

Suzuki

[11] Patent Number: 5,439,746
[45] Date of Patent: Aug. 8, 1995

[54] EPOXY RESIN-BASIN COMPOSITE MATERIAL
[75] Inventor: Shuichi Suzuki, Yokohama, Japan
[73] Assignee: Kabushiki Kaisha Toshiba, Kawasaki, Japan
[21] Appl. No.: 215,972
[22] Filed: Mar. 18, 1994

Related U.S. Application Data

[63] Continuation of Ser. No. 871,726, Apr. 21, 1992, abandoned.

[30] Foreign Application Priority Data

| Sep. 9, 1991 | [JP] | Japan | 3-227905 |
| Sep. 9, 1991 | [JP] | Japan | 3-227911 |
| Sep. 13, 1991 | [JP] | Japan | 3-234683 |

[51] Int. Cl.⁶ .......................... B32B 17/10; C08F 2/46
[52] U.S. Cl. .................... 428/415; 428/413; 428/297; 522/13; 522/16; 522/18; 522/28; 522/29; 522/170
[58] Field of Search ............. 428/415, 413, 297; 522/13, 16, 18, 28, 29, 170

[56] References Cited

U.S. PATENT DOCUMENTS

| 4,092,443 | 5/1978 | Green | 522/170 |
| 4,322,513 | 3/1982 | Wada | 528/361 |
| 4,324,873 | 4/1982 | Wada | 528/410 |
| 4,406,764 | 9/1983 | Hayase | 522/11 |
| 4,666,951 | 5/1987 | Onishi | 522/13 |
| 4,816,496 | 3/1989 | Wada | 522/18 |
| 4,975,471 | 12/1990 | Hayase | 522/14 |

FOREIGN PATENT DOCUMENTS

| 56-2319 | 1/1981 | Japan. |
| 56-55422 | 5/1981 | Japan. |
| 61-218624 | 9/1986 | Japan. |

Primary Examiner—Mark A. Chapman
Attorney, Agent, or Firm—Oblon, Spivak, McClelland, Maier, & Neustadt

[57] ABSTRACT

Disclosed is an epoxy resin-based composite material formed by coating or impregnating a sheet-like reinforcement with an epoxy resin composition, followed by curing the resin composition. The epoxy resin composition comprises a compound having at least one epoxy group, a compound having an active hydrogen, a silicon compound having or generating hydroxy group bonded to silicon atom, and an organometallic compound. The epoxy resin may further comprise a maleimide compound or a powdery and granular material and a short fiber. The composite material ensures the properties of the epoxy resin material in terms of the mechanical strength, corrosion resistance, heat resistance and electrical properties. Besides, the composite material exhibits excellent crack resistance and impact resistance. Further, the epoxy resin composition contained in the composite material exhibits sufficient curing characteristics and, thus, the operation for forming the composite material is facilitated.

16 Claims, No Drawings

EPOXY RESIN-BASIN COMPOSITE MATERIAL

This application is a continuation of application Ser. No. 07/871,726, filed on Apr. 21, 1992, now abandoned.

BACKGROUND OF THE INVENTION

1. Field of the Invention

The present invention relates to an epoxy resin-based composite material which can be widely used in, for example, an artificial satellite body structure, an aircraft body structure, a radar dome body structure, and an antenna body structure as well as a golf club shaft, a tennis racket, a fishing rod, and an electric appliance.

2. Description of the Related Art

A material which is light, has a high rigidity and exhibits a high mechanical strength is required as a structural material in the fields of an artificial satellite, an aircraft, etc. It was customary in the past to use as such materials CFRP containing a carbon fiber as a reinforcing material, or reinforcement and a composite material including an epoxy resin as a matrix and a reinforcement such as a boron fiber, a silicon carbide fiber, or a glass fiber. These epoxy resin-based composite materials are excellent in mechanical properties, electrical properties, water resistance, heat resistance and chemical resistance.

The epoxy resin, which is thermosetting, is used in the epoxy resin-based composite material as a matrix in the form of a composition prepared by adding a curing agent, a curing catalyst, etc. to the thermosetting epoxy resin. However, in the conventional epoxy resin-based composite material containing the epoxy resin composition, the properties of the composite material are markedly varied by the curing agent and the curing catalyst contained in the matrix material, making it difficult to select appropriately the curing agent and the curing catalyst. In addition, how to perform the curing operation is an important technical problem to be solved. What should also be noted is that the thermal curing reaction is carried out at high temperatures, with the result that it is also important to take suitable measures for saving the required energy and for improving the operating environment.

For example, boron trifluoride complex or dicyandiamide is used as a curing agent for a thermosetting epoxy resin. However, a composite material formed by using an epoxy resin composition containing boron trifluoride as a curing agent is markedly poor in its corrosion resistance and electrical properties. It follows that the use of boron trifluoride as a curing agent is much restricted. On the other hand, the dicyandiamide curing agent is poor in compatibility with an epoxy resin, making it very difficult to disperse the curing agent uniformly in the epoxy resin composition.

It is also proposed to employ a laminate structure in various composite materials including an epoxy resin-based composite material. Specifically, it is proposed that a reinforcement comprising a fibrous sheet formed by arranging carbon fibers or boron fibers in one direction and a resin composition acting as a matrix are combined and, then, a plurality of the sheets are laminated, followed by curing the matrix so as to form a composite material exhibiting a high mechanical strength and a high elasticity. However, the composite material of this type gives rise to serious problems in terms of, for example, the impact resistance, crack resistance and mechanical strength in directions other than the arranging direction of the fibers of the sheet-like reinforcement.

SUMMARY OF THE INVENTION

The present invention has been achieved in view of the situation described above, and is intended to provide an epoxy resin-based composite material which exhibits excellent crack resistance and impact resistance while ensuring the excellent properties of the epoxy resin in terms of, for example, the mechanical strength, heat resistance, corrosion resistance and electrical properties, which can be formed easily by a rapid curing operation of the matrix.

According to the present invention, there is provided an epoxy resin-based composite material formed by coating or impregnating a reinforcement with an epoxy resin composition, followed by curing the resin composition, said epoxy resin composition comprising a compound having at least one epoxy group, a compound having an active hydrogen, a silicon compound having or generating hydroxyl group bonded to silicon atom, and an organometallic compound.

The epoxy resin-based composite material of the present invention comprises a reinforcement and a matrix. Used in the present invention is a curable epoxy resin composition as the matrix material. The resin composition of the present invention is most featured in that a binary curing catalyst comprising a silicon compound and an organometallic compound is added to a compound having at least one epoxy group, i.e., epoxy resin acting as a matrix resin and a compound having an active hydrogen, said compound acting as the curing agent.

The particular combination of the curing agent and the curing catalyst employed in the present invention is highly compatible with the epoxy resin. In addition, it is possible to control as desired the curing reaction rate of the epoxy resin composition in the step of forming a composite material by suitably controlling the combination and formulation of the compounds providing the binary curing catalyst and the adding amount of the binary catalyst in the resin composition. It follows that the epoxy resin-based composite material of the present invention permits shortening the curing time of the matrix and also permits lowering the curing temperature without difficulty. Further, the composite material of the present invention permits ensuring the desired performance of the epoxy resin material in terms of the mechanical properties, physical properties, electrical properties and corrosion resistance including the resistance to chemicals, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

In the epoxy resin-based composite material of the present invention, it is desirable to use a sheet-like reinforcement. The sheet-like reinforcement is not particularly restricted in the present invention as far as the material can be used in a general composite material as a reinforcement for improving the mechanical strength of the matrix of the composite material. Specific examples of the sheet-like reinforcement used in the present invention include a sheet of an inorganic or organic fibrous material such as carbon fiber, glass fiber, boron fiber, nitride compound fiber or aromatic polyamide fiber. Preferred is a sheet-like material formed by arranging bundles of fibers of the raw materials exemplified above in one direction.

In the case of using as the reinforcement a sheet-like material, the epoxy resin-based composite material of the present invention can be formed, for example, as follows. In the first step, the sheet-like reinforcement (material) is coated or impregnated with an epoxy resin composition, followed by slightly heating the sheet-like material so as to obtain a prepreg. Then, a plurality of prepreg sheets are laminated one upon the other such that the arranging direction of fibers constructing one sheet makes an appropriate angle with the arranging direction of fibers constructing another sheet in direct contact with said one sheet. Under this condition, the epoxy resin composition acting as a matrix is cured so as to obtain a desired composite material.

The prepreg can be cured by applying, for example, heating and/or light irradiation to the prepreg, though the curing means of the prepreg can be selected appropriately depending on the kinds of the compounds contained in the epoxy resin composition. Particularly, where the epoxy resin composition contains a silicon compound which can be decomposed by the light irradiation to generate hydroxyl group bonded to silicon atom, it is desirable to irradiate the prepreg with, for example, ultraviolet light so as to cure the prepreg. In this case, however, it is desirable to apply a heat treatment in addition to the light irradiation to the prepreg because the light irradiation, when employed singly, fails to enable the resultant composite material, particularly the matrix, to exhibit a sufficiently improved mechanical strength, in some cases.

Further, it is possible to control as desired the properties of the resultant composite material by adjusting the arranging direction of the fibers constructing each of the prepreg sheets which are laminated one upon the other such that the arranging direction of the fibers in one sheet makes a desired angle with the arranging direction of the fibers in another sheet.

The epoxy resin-based composite material of the present invention can also be formed as follows. Specifically, for example, a sheet-like tape of glass fibers or mica is wound in advance onto an electrical conductor, followed by impregnating the conductor with the epoxy resin composition. Then, the resin composition is thermally cured so as to obtain a desired composite material exhibiting excellent electrical and mechanical performances.

Further, the epoxy resin-based composite material of the present invention can be formed as a material used for manufacturing various structures, parts, electric appliances, etc. In this case, the resin composition is mixed in advance with powder of an organic, inorganic, or metallic material, followed by subjecting the mixture to a transfer molding, injection molding, casting, etc. so as to obtain a composite material in the desired shape.

On the other hand, a curable resin composition containing an epoxy resin as a main component is used as a matrix in the composite material of the present invention. As described previously, a reinforcement is coated or impregnated with the epoxy resin composition, followed by curing the resin composition by means of heating and/or light irradiation. The curing means can be determined appropriately depending on the kinds of the compounds contained in the resin composition.

The epoxy resin composition used in the present invention contains a compound having at least one epoxy group. The epoxy resin corresponds to the main component of the matrix included in the composite material. The epoxy resin used in the present invention includes, for example, bisphenol A type epoxy resin, bisphenol S type epoxy resin, hisphenol K type epoxy resin, bisphenol F type epoxy resin, phenolic novolak type epoxy resin, cresol novolak type epoxy resin, allcyclic epoxy resin, heterocyclic epoxy resins such as triglycidyl isocyanuric and hydantoin epoxy, hydrogenated bisphenol A type epoxy resin, aliphatic epoxy resins such as propylene glycol-diglycidyl ether and pentaerythritolpolyglycidyl ether, epoxy resins obtained by the reaction between an aromatic, aliphatic or alicyclic carboxylic acid and epichlorohydrin, and epoxy resin having a spiro ring, a glycidyl ether type epoxy resin which is obtained by the reaction between ortho-allyl phenolic novolak compound and epichlorohydrin, and a glycidyl ether type epoxy resin which is obtained by the reaction between diallyl bisphenol compound having an allyl group in the ortho site of bisphenol A with respect to the hydroxyl group and epichlorohydrin. In addition, it is possible to use derivatives such as ethylene oxide, propylene oxide, styrene oxide, cyclohexene oxide and phenyl glycidyl ether, as desired. These epoxy resins can be used singly or in the form of a mixture of at least two kinds of the epoxy resins.

The epoxy resin composition used in the present invention contains a compound having at least one active hydrogen. The particular compound acts as a curing agent of the epoxy resin. The compound having at least one active hydrogen, or the curing agent used in the present invention includes, for example, a phenolic compound, an amine compound, an imide compound, an amide compound, a barbituric acid derivative, a cyanuric acid derivative, a thio phenolic compound, and a carboxylic acid compound. Among these compounds, it is desirable to use a phenolic compound and an amine compound. Particularly preferred in the present invention are compounds in which —OH group, —NH$_2$ group, or =NH group is bonded directly to an aryl group.

The phenolic compound noted above includes, for example, phenol, cresol, resorcinol, o-cresol, m-cresol, p-cresol, chlorophenol, nitrophenol, bromophenol, dinitrophenol, hydroquinone, pyrocatechol, pyrogallol, hydroxyhydroquinone, 2-methoxyphenol, 2,5-dichlorophenol, 3-acetoxyphenol, m-aminophenol, p-aminophenol, 4,4'-dihydroxydiphenylpropane, 4,4'-dihydroxydiphenylmethane, 3,3'-dihydroxydiphenylpropane, 4,4'-dihydroxy diphenyl ether, 4,4'-dihydroxydiphenylethane, 4,4'-dihydroxy diphenyl ketone, 2-allylphenol, and 2-allylcresol. It is also possible to use phenol derivatives which are obtained by the reaction between the phenolic compounds exemplified above and various aldehyde compounds such as formalin and acetaldehyde. These phenolic compounds can be used singly or in the form of a mixture of at least two kinds of phenolic compounds.

The amine compound used in the present invention includes, for example, phenylenediamine, diaminodiphenylmethane, diaminodiphenyl ether, diaminodiphenyl sulfone, diaminodiphenyl sulfide, an aromatic amine compound comprising a halogen-substituted derivative or an alkyl-substituted derivative of the compounds exemplified above, an amine compound obtained by the reaction between aniline or an aniline derivative and an aldehyde compound, and an amino phenol derivative having both a hydroxyl group and an amino group in a molecule. In addition, it is possible to use a compound having a secondary amino group in which at least one active hydrogen included in the amino group is substituted by an alkyl group or an aryl group. These amine compounds can be used singly or in the form of a mixture of at least two amine compounds.

The compound having an active hydrogen should be used in an amount of 0.5 to 1.5 equivalents, preferably 0.7 to 1.1 equivalents, relative to one epoxy equivalent of the compound having at least one epoxy group. Where the amount of the compound having an active hydrogen is less than 0.5 equivalent, it is impossible to achieve a sufficient curing characteristics of the composition. The composition also fails to exhibit the sufficient curing characteristics in the case where the amount of the compound having an active hydrogen is larger than 1.5 equivalents. In particular, use of an unduly large amount of the compound having an active hydrogen is defective in that the hygroscopicity of the resin composition is increased.

The epoxy resin composition used in the present invention further contains a binary system comprising a silicon compound having or generating hydroxyl group bonded to silicon atom and an organometallic compound. The binary system noted above acts as a curing catalyst of the compound having at least one epoxy group.

The silicon compound having hydroxyl group bonded to silicon atom, i.e., a silanol compound, which is used in the present invention, includes, for example, diphenylmethylsilanol, phenylvinylsilanediol, tri-(p-methoxyphenyl)silanol, triacetylsilanol, diphenylethylsilanol, diphenylpropylsilanol, tri-(p-nitrophenyl) silanol, phenyldivinylsilanol, 2-butenyldiphenylsilanol, 2-pentenyldiphenylsilanol, phenyldipropylsilanol, p-methylbenzyldimethylsilanol, triethylsilanol, tripropylsilanol, tributylsilanol, and triisobutylsilanol.

The silicon compound which generates hydroxyl group bonded to silicon atom, which is used in the present invention, includes, for example, a compound having a hydrolyzable group bonded directly to silicon atom, and a compound which generates hydroxyl group bonded directly to silicon atom as a result of photo decomposition. These silicon compounds each generate hydroxyl groups bonded directly to silicon atoms so as to convert into silanol compounds.

The silicon compound having a hydrolyzable group noted above includes, for example, triphenylmethoxysilane, diphenyldimethoxysilane, triphenylethoxysilane, diphenylmethylmethoxysilane, phenylvinylmethylmethoxysilane, diphenyldiethoxysilane, tri-(p-methoxyphenyl)methoxysilane, triacetylmethoxysilane, diphenylpropylethoxysilane, diphenylpropionylmethoxysiliane, diphenylmethyltriphenylacetoxysilane, tri-(p-nitrophenyl)methoxysilane, triacetylmethoxysilane, phenyldivinylmethoxysilane, 2-butenyldiphenylmethoxysilane, di-(2-pentenyl)phenylethoxysilane, phenyldipropylmethoxysilane, tri-(p-methoxyphenyl)ethoxysilane, paramethylbenzyltrimethoxysilane, trifluoroacetyltrimethoxysilane, di-(p-chlorophenyl) diethoxysilane, triethylmethoxysilane, trimethylmethoxysilane, tripropylmethoxysilane, tributylethoxysilane, triisobutylacetomethoxysilane, and compounds SI-1 and SI-2 given below:

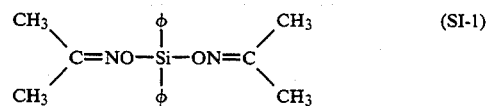

(SI-1)

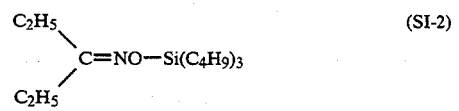

(SI-2)

On the other hand, the silicon compound which generates hydroxyl group upon light irradiation, which is used in the present invention, includes, for example, a peroxysilane compound, a compound having an α-ketosilyl group, and a silicon compound in which o-nitro benzyloxy group is directly bonded to silicon atom.

In the epoxy resin composition used in the present invention, the compound having or generating hydroxyl group bonded to silicon atom is used in an amount of 0.01 to 30%, preferably 0.1 to 10%, by weight based on the amount of the epoxy resin, i.e., a compound having at least one epoxy group. If the amount is smaller than 0.001% by weight, it is impossible to achieve a sufficient curing characteristics of the composition. Where the amount exceeds 30% by weight, however, the manufacturing cost of the composite material is unduly increased. In addition, in this case, the compatibility of the silicon compound with the other components in the composition tends to be lowered.

Further, in the present invention, the epoxy resin composition may contain the silicon compound having hydroxyl group bonded to silicon atom and that generating hydroxyl group bonded to silicon atom in combination.

On the other hand, the organometallic compound used in the present invention includes, for example, compounds having various organic groups bonded directly to metallic atoms such as aluminum, titanium, chromium, zirconium, copper, iron, manganese, nickel, vanadium or cobalt. It is also possible to use complex compounds of the metals exemplified above. It is particularly desirable to use organoaluminum compounds including, for example, aluminum complex compounds having an alkoxy group, a phenoxy group, an acyloxy ligand, a β-diketonato ligand or an o-carbonyl phenolato ligand bonded to aluminum atom.

It is desirable for the alkoxy group noted above to have 1 to 10 carbon atoms, said alkoxy group including, for example, methoxy, isopropoxy, butoxy and pentoxy. The phenoxy group bonded to the aluminum atom includes, for example, phenoxy, o-methylphenoxy, o-methoxyphenoxy, p-nitrophenoxy and 2,6-dimethylphenoxy. The acyloxy ligand bonded to the aluminum atom includes, for example, acetato, propionato, isopropionato, butyrato, stearato, ethyl acetoacetato, propyl acetoacetato, butyl acetoacetato, diethyl maleato, and dipivaloyl methanato. Further, the β-diketonato ligand bonded to the aluminum atom includes, for example, acetylacetonato, trifluoroacetylacetonato, hexafluroacetylacetonato, and compounds (Li-1) to (Li-3) given below:

(Li-1)

$$\text{Ph-CO-CH}_2\text{-CO-CH}_3$$

(Li-2)

$$\text{CH}_3\text{-CO-CH(CH}_3\text{)-CO-CH}_3$$

(Li-3)

$$(\text{CH}_3)_3\text{C-CO-CH}_2\text{-CO-C(CH}_3)_3$$

Still further, the o-carbonyl phenolato ligand bonded to the aluminum atom includes, for example, salicyl aldehydato.

The specific organoaluminum compounds used in the present invention include, for example, tris-methoxyaluminum, tris-ethoxyaluminum, tris-isopropoxyaluminum, tris-phenoxyaluminum, tris-p-methylphenoxyaluminum, isopropoxydiethyoxyaluminum, tris-butoxyaluminum, tris-acetoxyaluminum, tris-stearatoaluminum, trisbutyratoaluminum, trispropionatoaluminum, trisisopropionatoaluminum, trisacetylacetatoaluminum, tristrifluoroacetylacetonatoaluminum, trishexafluoroacetylacetonatoaluminum, tris(ethylacetoacetato)aluminum, trissalicylaldehydatoaluminum, trisdiethylmaleatoaluminum, tris(propylacetoacetato)aluminum, tris(butylacetoacetato)aluminum, trisdipivaloylmethanatoaluminum, diacetylacetonatodipivaloylmethanatoaluminum and compounds (Al-1) to (Al-10) given below:

(Al-1)

(Al-2)

(Al-3)

(Al-4)

(Al-5)

(Al-6)

(Al-7)

(Al-8)

(Al-9)

(Al-10)

These organoaluminum compounds can be used singly or in the form of a mixture comprising at least two organoaluminum compounds. In the epoxy resin composition used in the present invention, the organoaluminum compound should be used in an amount of 0.001 to 10%, preferably 0.1 to 5%, by weight based on the amount of the epoxy resin, i.e., a compound having at least one epoxy group. If the mixing amount of the organoaluminum compound is smaller than 0.001% by weight, it is impossible to exhibit a sufficient curing characteristics of the composition. Where the mixing amount exceeds 10% by weight, however, the electrical properties of the resultant composite material are deteriorated. In addition, the manufacturing cost of the composite material is unduly increased.

In the epoxy resin-based composite material of the present invention, the resin composition comprising the components described above constitute a matrix of the composite material.

It is possible for the epoxy resin composition used in the present invention to contain a maleimide compound. The presence of the maleimide compound serves to improve the mechanical strength of the matrix of the composite material.

The maleimide compound used in the present invention can be prepared by the reaction among maleic anhydride, a compound having an amino group and, as desired, another acid anhydride so as to form an amic acid, followed by dehydrating and cyclizing the amic acid by using a lower acid anhydride such as acetic anhydride and sodium acetate. The specific compounds having an amino group, which are used for synthesizing the maleimide compound added to the epoxy resin composition, include, for example, 4,4'-diaminodiphenylmethane, 4,4'-diaminodiphenyl ether, 4,4'-diaminodiphenyl sulfone, 4,4'-diaminodiphenyl ketone, o-phenylenediamine, m-phenylenediamine, p-phenylenediamine, 3,3'-dimethyl-4,4'-diaminodiphenylmethane, 3,3'-diethyl-4,4'-diaminodiphenylmethane, 2,2-bis(4-aminophenyl)propane, 4,4'-diaminodiphenylsulfide, 1,5-diaminonaphthalene, 1,1-bis(p-aminophenyl)phthalane, 4,4'-methylene-bis(2-chloroaniline), 3,3'-dimethoxy-4,4'-diaminodiphenylmethane, 3,3'-dimethyl-4,4'-diaminodiphenylmethane, 2,2',dichloro-4,4'-diamino-5,5'-dimethoxybiphenyl, 2,2'-5,5'-tetrachloro-4,4'-diaminobiphenyl, 4,4'-methylene-bis(2-chloroaniline), 3,4-diaminodiphenyl ether, 2,2-bis[4-(4-aminophenoxy)phenyl]propane, bis[4-(4-aminophenoxy)phenyl]sulfone, bis[4-(3-aminophenoxy)phenyl]sulfone, 4,4'-bis(4-aminophenoxy)biphenyl, bis[4-(4-aminophenoxy)phenyl]ether, 2,2-bis[4-(4-aminophenoxy)phenyl]hexafluoropropane, 1,4-bis(4-aminophenoxy)benzene, 4,4'-diaminobenzanilide, 3,3',4,4'-biphenyltetraamine, 3,3'-dihydroxy-4,4'-diaminobiphenyl, 9,10-bis(4-aminophenyl)anthracene, 9,9-bis(4-aminophenyl)fluorene, and o-toluidine.

Where the maleimide compound is added to the epoxy resin composition used in the present invention, the amount of the compound having an active hydrogen should fall within a range of between 0.7 and 1.2 equivalents relative to one equivalent in the total amount of the epoxy resin and the maleimide resin. Also, it is desirable for the amount of the maleimide compound to be 0.95 equivalent or less in general relative to one equivalent in the total amount of the epoxy resin and the maleimide resin. Where the maleimide compound amount exceeds 0.95 equivalent, the resin composition tends to be excessively cured.

In the resin composition used in the epoxy resin-based composite material of the present invention, it is also possible to use a powdery and granular material in addition to the epoxy resin, curing agent, and the binary catalyst described above. The powdery and granular material serves to improve the mechanical strength of the matrix included in the epoxy resin-based composite material. It is also possible for the resin composition to contain a short fiber in addition to the powdery and granular material. In the case of using both the powdery and granular material and the short fiber, the viscosity of the epoxy resin composition is not increased so as to facilitate the coating or impregnation of the reinforcement with the epoxy resin composition. In other words, the operation for forming the composite material can be facilitated by the addition of the powdery and granular material and short fiber to the resin composition.

Where sheets formed of a fibrous material are used as the reinforcement, the powdery and granular material is loaded around each of the fibers constructing the reinforcement and in the free space between adjacent fibers so as to improve the mechanical strength of the composite material in a direction perpendicular to the direction of orientation of the fibers constructing the sheet-like reinforcement. Particularly, where an external force is applied to the composite material, the energy of the external force is supposed to be distributed and transmitted within the composite material by the presence of the powdery and granular material, with the result that the composite material is prevented from being cracked.

The short fiber also permit improving the mechanical strength of the composite material. Further, where the composite material is formed by laminating a plurality of sheet-like materials one upon the other, each of the sheet-like materials being coated or impregnated with the epoxy resin composition, followed by thermally curing the laminate structure, the short fibers permit improving the bonding strength between adjacent layers, or the sheets constructing the laminate structure so as to prevent the layers from being peeled off the laminate structure.

As described above, where the resin composition forming a matrix in the epoxy resin-based composite material of the present invention contains a powdery and granular material and, as desired, a short fiber, further improvements can be achieved in respect of the curing characteristics, mechanical strength and shrink characteristics of the composite material.

In the present invention, it is possible to use various inorganic materials, organic materials, polymer materials and metallic materials as the powdery and granular material which is added to the epoxy resin composition. The specific materials used as the powdery and granular material include, for example, silica, alumina, talc, calcium carbonate, clay, aluminum hydroxide, barium sulfate, titanium dioxide, silicon nitride, silicon carbide, boron nitride, graphite, polyimide, polysulfone, and phenoxy. Where the sheet-like material coated or impregnated with the epoxy resin composition is formed of a fibrous material, the diameter of the powdery and granular material should desirably be smaller than the diameter of the fiber constructing the fibrous material, as described later.

Where the powdery and granular material is added to the epoxy resin composition used in the present invention, the amount of the powdery and granular material should fall within a range of between 10 and 300 parts by weight, preferably between 50 and 250 parts by weight, relative to 100 parts by weight of the epoxy resin composition. where the amount of the powdery and granular material is less than 10 parts by weight, the powdery and granular material fails to exhibit the particular effect sufficiently. Where the amount exceeds 300 parts by weight, however, the viscosity of the resultant composition is markedly increased. As a result, it is difficult to knead the composition. It is also difficult to subject the composition to a molding treatment.

On the other hand, any kinds of short fibers can be used in the present invention as far as the short fiber is generally used as a reinforcing material of a matrix. The specific short fibers used in the present invention include, for example, glass fiber, alumina fiber, boron fiber, silicon carbide fiber, metal whisker, polyamide fiber and polybenzoimidazol fiber.

Where the short fiber is added to the epoxy resin composition used in the present invention, the amount of the short fiber should fall within a range of between 10 and 300 parts by weight, preferably between 50 and 250 parts by weight, relative to 100 parts by weight of the epoxy resin composition. Where the amount of the short fiber is less than 10 parts by weight, the short fiber fails to exhibit the particular effect sufficiently. Where the amount exceeds 300 parts by weight, however, the viscosity of the resultant composition is markedly increased. As a result, it is difficult to knead the composition. It is also difficult to subject the composition to a molding treatment.

The properties such as a mechanical strength of the epoxy resin-based composite material of the present invention can be further improved in the case where the epoxy resin composition acting as a matrix of the composite material contains the powdery and granular material and/or the short fiber as well as the maleimide compound described previously.

The epoxy resin composition used in the composite material of the present invention can be prepared by dissolving the components of the composition in a suitable diluent.

As described above, the powdery and granular material defined in the present invention can be added to the matrix material of the epoxy resin-based composite material so as to permit improving the properties of the composite material. In addition, the powdery and granular material can also be added to the matrix material of another composite material including a matrix comprising of resins other than epoxy resin so as to improve the properties of said another composite material. To be more specific, an arbitary composite material can be formed by coating or impregnating a reinforcement with an optional resin composition comprising an arbitrary matrix resin other than epoxy resin, a powdery and granular material and, as desired, a short fiber, followed by applying a predetermined treatment to the coated or impregnated material. The arbitrary composite material thus formed exhibits excellent properties in terms of the crack resistance, mechanical strength and shrink characteristics like the composite material formed by using an epoxy resin composition containing the powdery and granular material and/or the short fiber.

Various thermosetting resins or thermoplastic resins, which are used in general in a resin-based composite material, can be used as a matrix resin to which the powdery and granular material and/or the short fiber are added. The specific matrix resins noted above include, for example, polyester resins, phenol resins, maleimide resins, polyimide resins, cyanic acid ester resins, oxazoline resins, and polyetheretherketone (PEEK) in addition to an epoxy resin. These resins can be used singly or in the form of a mixture of at least two kinds of these resins.

In the case of using thermosetting resins as the matrix resin, a curing agent and a curing catalyst are used together with the resin as in the epoxy resin composition described previously. In this case, the forming conditions such as the curing temperature of the thermosetting resin and the properties of the resultant composite material are greatly changed depending on the kinds of the curing agent and the curing catalyst added to the resin composition. It follows that it is important to select the curing agent and the curing catalyst appropriately in view of the kind of the matrix resin and the use of the resultant composite material.

The reinforcement equal to that used in the epoxy resin-based composite material can be used in the arbitrary resin-based composite material. Preferably, a sheet-like material formed of a fibrous material should be used as the reinforcement in the arbitrary resin-based composite material.

In the case of using, for example, a sheet-like reinforcement, the arbitrary resin-based composite material can be formed as follows. Specifically, in the case of using a thermosetting resin as a matrix resin, the sheet-like reinforcement is coated or impregnated first with a composition containing the thermosetting resin, followed by applying a slight heat treatment to the coated or impregnated material so as to obtain a prepreg. Then, a plurality of prepreg sheets thus obtained are laminated one upon the other so as to form a laminate structure, followed by curing the resin composition by applying a heat treatment to the laminate structure so as to obtain a desired composite material. On the other hand, in the case of using a thermoplastic resin as a matrix resin, a sheet-like reinforcement is coated or impregnated first with a composition containing the thermoplastic resin. A plurality of sheets thus formed are laminated one upon the other, as desired, followed by applying a heat treatment under pressure to the resultant laminate structure so as to obtain a desired composite material.

In the case of the arbitrary resin-based composite material, it is possible to control as desired the properties of the composite material by adjusting the direction of the fiber arrangement in one prepreg sheet (sheet-like material) relative to the fiber arrangement direction in the adjacent prepreg sheets, as in the epoxy resin-based composite material.

Let us describe some examples of the present invention.

EXAMPLES 1 TO 3

Bundles of carbon fibers (pitch-series carbon fiber), each bundle comprising 3000 carbon fibers and each fiber having a diameter of 7 microns, were arranged in one direction in a manner to form a sheet so as to form a sheet-like reinforcement. The reinforcement was found to exhibit a tensile modulus of 39 t./mm$^2$.

On the other hand, epoxy resin compositions of formulations shown in Table 1 below were prepared by using at least one of "Epikote 828" (trade name of an epoxy resin manufactured by Shell Chemical Co., Ltd.), "Epikote 1001", "Epikote 1004" and "Epikote 1007" as an epoxy resin, i.e., compound having at least one epoxy group, diaminodiphenylmethane as a compound having an active hydrogen, trisacetylacetonatoaluminum or tris(ethylacetoacetato)aluminum as an organometallic compound, diphenyldimethoxysilane or triphenylethoxysilane as a silicon compound, and methyl ethyl ketone as a diluent.

In the next step, the sheet-like reinforcement was impregnated or coated with the epoxy resin composition noted above, followed by putting the impregnated or coated sheet to air-drying and subsequently applying a heat treatment at 40° to 60° C. for 10 minutes to the dried sheet so as to obtain a prepreg sheet. The prepreg sheet thus obtained was cut into small pieces of a desired shape, followed by laminating four cut pieces of the prepreg sheet one upon the other. The cut pieces were laminated such that the arranging direction of the carbon fibers in one cut piece is perpendicular to the arranging direction of the carbon fibers in adjacent cut piece. The upper and lower surfaces of the laminate structure were covered with a mold-releasing sheet. Under this condition, the laminate structure was disposed between a pair of stainless steel plates each having a thickness of 2 mm. Further, the resultant structure was housed in a vacuum forming bag. The bag was then put in an autoclave and heated at 150° to 170° C. for a predetermined period of time so as to cure the resin composition within the laminate structure and, thus, to obtain an epoxy resin-based composite material of the present invention.

The tensile strength of the composite material thus obtained is shown in Table 1 together with the curing conditions.

CONTROL 1

A composite material was formed as in Examples 1 to 3, except that an organometallic compound, a silicon compound and a diluent were not contained in the epoxy resin composition used in Control 1, as shown in Table 1. The tensile strength of the composite material and the curing conditions for Control 1 are also shown in Table 1. Incidentally, the mixing amounts of the components of the resin composition show in Table 1 as well as in Tables 2 to 7 referred to later denote the percentages by weight.

TABLE 1

|  | Examples | | | Control |
|---|---|---|---|---|
|  | 1 | 2 | 3 | 1 |
| Epikote 828 #1 | 25 | 20 | 20 | 20 |
| Epikote 1001 #1 | 5 | 10 | 10 | 10 |
| Epikote 1004 #1 | 8 | 5 | 5 | 5 |
| Epikote 1007 #1 |  | 5 | 5 | 5 |
| Diaminodiphenyl-methane #2 | 12 | 10 | 10 | 10 |
| Trisacetylacetonato-aluminum #3 |  | 1 | 1.5 |  |
| Tris(ethylaceto-acetato)aluminum #3 | 1 |  |  |  |
| Diphenyldimethoxy-silane #4 |  | 2 | 3 |  |
| Triphenylethoxy-silane #4 | 2 |  |  |  |
| Methyl ethyl ketone #5 | 47 | 47 | 45.5 | 50 |
| Curing Condition |  |  |  |  |
| 150° C. × (hour) | 1 |  |  |  |
| 160° C. × (hour) |  | 1 | 0.8 |  |
| 170° C. × (hour) |  |  |  | 2 |
| Tensile strength (Kg/mm$^2$) | 87 | 92 | 94 | 85 |

Note:
1 Epoxy resin, i.e., compound having at least one epoxy group
2 Compound having active hydrogen
3 Organometallic compound
4 Silicon compound
5 Diluent As apparent from the results shown in Table 1, the matrix resin, i.e., epoxy resin composition, used in the composite material of the present invention can be cured under a lower temperature and in a short time, compared with the control case. In addition, the epoxy resin-based composite material of the present invention exhibits excellent mechanical properties.

Further, the composite material for each of Examples 1 to 3 and Control 1 was left to stand under a steam pressure of 2 kg/cm$^2$ for 30 minutes. This operation was repeatedly carried out five times for each of the samples, followed by measuring the volume resistivity of each sample. It was found that, in any of the composite materials formed in Examples 1 to 3, the reduction in the value of the volume resistivity from the initial value, i.e., the resistivity before the treatment with the steam pressure, was only 3% in contrast to as much as 15% for the composite material of Control 1. It follows that the composite material of the present invention exhibits excellent electrical properties, compared with the control case.

REFERENCE EXAMPLE

An epoxy resin composition was formed by using 30% by weight of Epikote 828, 2% by weight of Epikote 1001 as compounds having at least one epoxy group, 15% by weight of diaminodiphenylmethane as a compound having an active hydrogen, 1% by weight trisacetylacetonatoaluminum as an organometallic compound, 1% by weight of benzophenone as a photosensitizer, and methyl ethyl ketone as a diluent.

In the next step, a prepreg sheet having a thickness of about 200 microns was formed by impregnating a glass cloth with the epoxy resin composition noted above, followed by air-drying and subsequently heating the impregnated glass cloth at 40° C. for 10 minutes. The glass prepreg sheet thus formed was irradiated for one minute with ultraviolet light emitted from a high pressure mercury lamp of 2 KW, followed by applying a heat treatment to the sheet at 150° C. for about 10 minutes so as to cure the resin composition and, thus, to obtain a composite material. The matrix in this composite material was found to be cured at a low temperature in a short time.

The composite material thus obtained was also subjected to a treatment under a steam pressure as in the composite materials of Examples 1 to 3 so as to measure the volume resistivity. The reduction in the value of the volume resistivity from the initial value was found to be only 3%, supporting excellent electrical properties of the composite material.

EXAMPLES 4 TO 7

Bundles of carbon fibers (pitch-series carbon fiber), each bundle comprising 3000 carbon fibers and each fiber having a diameter of 7 microns, were arranged in one direction in a manner to form a sheet so as to form a sheet-like reinforcement. The reinforcement was found to exhibit a tensile modulus of 49 t./mm$^2$.

On the other hand, epoxy resin compositions of formulations shown in Table 2 below were prepared by using at least one of "Epikote 807" (trade name of an epoxy resin manufactured by Shell Chemical Co., Ltd.), "ELM434" (trade name of an epoxy resin manufactured by Sumitomo Chemical Co., Ltd.), and "TACTIX556" (trade name of an epoxy resin manufactured by Dow Chemical Co., Ltd.) as an epoxy resin, i.e., compound having at least one epoxy group, diaminodiphenyl sulfone as a compound having an active hydrogen, tris(ethylacetoacetato)aluminum as an organometallic compound, and triphenylsilanol or o-nitrobenzylsilyl ether (ONB) as a silicon compound.

In the next step, the sheet-like reinforcement was impregnated or coated with the epoxy resin composition noted above, followed by putting the impregnated or coated sheet to air-drying and subsequently applying a heat treatment at 40° to 60° C. for 10 minutes to the dried sheet so as to obtain a prepreg sheet. The prepreg sheet thus obtained was cut into small pieces of a desired shape, followed by laminating four cut pieces of the prepreg sheet one upon the other. The cut pieces were laminated such that the arranging direction of the carbon fibers in one cut piece is perpendicular to the arranging direction of the carbon fibers in adjacent cut piece. The upper and lower surfaces of the laminate structure were covered with a mold-releasing sheet. Under this condition, the laminate structure was disposed between a pair of stainless steel plates each having a thickness of 2 mm. Further, the resultant structure was housed in a vacuum forming bag. The bag was then put in an autoclave and heated at 135° to 170° C. for a predetermined period of time so as to cure the resin composition within the laminate structure and, thus, to obtain an epoxy resin-based composite material of the present invention. In the process of forming the composite material of Example 7, the bag was irradiated with ultraviolent light for about 15 minutes, said ultraviolent light being emitted from a high pressure mercury lamp of 2 KW, in place of being cured by heating at 135° C.

The tensile strength of the composite material thus obtained is shown in Table 2 together with the curing conditions.

TABLE 2

|  | Examples | | | |
| --- | --- | --- | --- | --- |
|  | 4 | 5 | 6 | 7 |
| Epikote 807 #1 | 22 | 22 | 35 | 30 |
| ELM434 #1 | 45 | 42 | 32 | 32 |
| TACTIX556 #1 |  | 4 |  | 5 |
| Diaminodiphenyl sulfone #2 | 31 | 30 | 31 | 31 |
| Tris(ethylacetoacetato)aluminum #3 | 1 | 1 | 1 | 1 |
| ONB #4 |  |  |  | 1 |
| Triphenyl silanol #4 | 1 | 1 | 1 |  |
| Curing Condition |  |  |  |  |
| 135° C. × (hour) | 1 | 1 | 1 | #5 |
| 160° C. × (hour) | 4 | 4 | 2 | 4 |
| 170° C. × (hour) |  |  | 1 |  |
| Tensile strength (Kg/mm$^2$) | 138 | 141 | 146 | 144 |

Note:
1 Epoxy resin, i.e., compound having at least one epoxy group
2 Compound having active hydrogen
3 Organometallic compound
4 Silicon compound
5 Light irradiation for 15 minutes As apparent from the results shown in Table 2, the matrix resin, i.e., epoxy resin composition, used in the composite material of the present invention can be cured under a lower temperature and in a short time. In addition, the epoxy resin-based composite material of the present invention exhibits excellent mechanical properties.

EXAMPLE 8

Bundles of carbon fibers (PAN-series carbon fiber), each bundle comprising 1000 to 3000 carbon fibers and each fiber having a diameter of 7 microns, were arranged in one direction in a manner to form a sheet so as to form sheet-like reinforcements used in each of Examples 8 to 11 and Control 2.

On the other hand, an epoxy resin composition of formulations shown in Table 3 was prepared by using Epikote 828, Epikote 1001 as compounds having at least one epoxy group, diaminodiphenylmethane as a compound having an active hydrogen, triphenylethoxysilane as a silicon compound, trisacetylacetonatoaluminum as an organometallic compound, N,N'-methylenedi-p-phenylene bismaleimide (MDBMI) as a maleimide compound and methyl ethyl ketone as a diluent. The amounts of these components are shown in Table 3.

In the next step, the sheet-like reinforcement was impregnated or coated with the epoxy resin composition noted above, followed by putting the impregnated or coated sheet to air-drying and subsequently applying a heat treatment at about 30° to 100° C. to the dried sheet so as to obtain a prepreg sheet. The prepreg sheet thus obtained was cut into small pieces of a desired shape, followed by laminating 10 cut pieces of the prepreg sheet one upon the other. The cut pieces were laminated such that the arranging direction of the carbon fibers in one cut piece is perpendicular to the arranging direction of the carbon fibers in the adjacent cut piece. The upper and lower surfaces of the laminate structure were covered with a mold-releasing sheet. Under this condition, the laminate structure was disposed between a pair of stainless steel plates. Further, the resultant structure was housed in a vacuum forming bag. The bag was then put in an autoclave and heated at 150° C. for one hour so as to cure the resin composition within the laminate structure and, thus, to obtain an epoxy resin-based composite material of the present invention.

The tensile strength as a mechanical strength of the composite material thus obtained was found to be 91 kg/mm$^2$.

EXAMPLES 9 TO 11

Epoxy resin compositions of formulations as shown in Table 3 were prepared, followed by forming epoxy resin-based composite materials of the present invention containing the composition noted above as a matrix as in Example 1 and under the curing conditions (temperature and heating time) shown in Table 3.

The tensile strength as a mechanical strength of the composite material thus obtained was measured, with the result as shown in Table 3.

CONTROL 2

An epoxy resin composition of formulation as shown in Table 3 was prepared. As seen from Table 3, the epoxy resin composition for Control 2 did not contain an organometallic compound, a silicon compound and a maleimide compound, which were contained in the compositions for Examples 8 to 11. Then, an epoxy resin-based composite material containing the composition as a matrix was formed as in Example 8 and under the curing conditions (temperature and heating time) shown in Table 3.

The tensile strength as a mechanical strength of the composite material thus obtained was measured, with the result as shown in Table 3.

TABLE 3

|  | Examples | | | | Control |
| --- | --- | --- | --- | --- | --- |
|  | 8 | 9 | 10 | 11 | 2 |
| Epikote 828 #1 | 25 | 24 | 20 | 20 | 20 |

TABLE 3-continued

|  | Examples | | | | Control |
| --- | --- | --- | --- | --- | --- |
|  | 8 | 9 | 10 | 11 | 2 |
| Epikote 1001 #1 | 4 | 5 | 9 | 9 | 10 |
| Epikote 1004 #1 |  | 7 | 5 | 5 | 5 |
| Epikote 1007 #1 |  |  | 4 | 4 | 5 |
| Diaminodiphenyl-methane #2 | 13 | 9 | 10 | 10 | 10 |
| Bisphenol A #2 |  | 2 |  |  |  |
| Trisacetylacetonato-aluminum #3 | 1 |  | 1 | 1.5 |  |
| Tris(ethylaceto-acetato)aluminum #3 |  | 1 |  |  |  |
| Diphenyldimethoxy-silane #4 |  |  | 2 | 3 |  |
| Triphenylethoxy-silane #4 | 2 | 2 |  |  |  |
| MDBMI #5 | 8 | 3 | 2 |  |  |
| ODBMI #5 |  |  |  | 2 |  |
| Methyl ethyl ketone #6 | 47 | 47 | 47 | 45.5 | 50 |
| Curing Condition |  |  |  |  |  |
| 150° C. × (hour) | 1 | 1 |  |  |  |
| 160° C. × (hour) |  |  | 1 | 0.8 |  |
| 170° C. × (hour) |  |  |  |  | 2 |
| Tensile strength (Kg/mm$^2$) | 91 | 88 | 96 | 95 | 84 |

Note:
1 Epoxy resin, i.e., compound having at least one epoxy group
2 Compound having active hydrogen
3 Organometallic compound
4 Silicon compound
5 Maleimide compound;
MDBMI — N,N'-methylene-p-phenylene bismaleimide
ODBMI — oxy-di-p-phenylene bismaleimide
6 Diluent As apparent from the results shown in Table 3, the matrix resin, i.e., epoxy resin composition, used in the composite material of the present invention can be cured under a lower temperature and in a short time, compared with the control case. In addition, the epoxy resin-based composite material of the present invention exhibits excellent mechanical properties, particularly where the epoxy resin composition acting as a matrix contains a maleimide compound.

Further, the composite material for each of Examples 8 to 11 and Control 2 was left to stand under a steam pressure of 2 kg/cm$^2$ for 30 minutes. This operation was repeatedly carried out five times for each of the samples, followed by measuring the volume resistivity of each sample. It was found that, in any of the composite materials formed in Examples 8 to 11, the reduction in the value of the volume resistivity from the initial value, i.e., the resistivity before the treatment with the steam pressure, was only 2% in contrast to as much as 15% for the composite material of Control 2. It follows that the composite material of the present invention exhibits excellent curing characteristics, mechanical properties, and electrical properties, compared with the control case.

EXAMPLE 12

An epoxy resin composition was prepared by using 25% by weight of Epikote 828, 4% by weight of Epikote 1001 as compounds having at least one epoxy group, 13% by weight of diaminodiphenylmethane as a compound having an active hydrogen, 1% by weight of triphenylsilyl-t-butylperoxide as a silicon compound, 1% by weight of benzophenone as a photosensitizer, 1% by weight of trisacetylacetonatoaluminum as an organometallic compound, 8% by weight of MDBMI as a maleimide compound and 47% of methyl ethyl ketone as a diluent. The amounts of the components given above are based on 100% by weight of the entire resin composition.

In the next step, a glass cloth was impregnated or coated with the epoxy resin composition noted above, followed by putting the impregnated or coated glass cloth to air-drying and subsequently applying a heat treatment at about 40° C. for 10 minutes to the dried glass cloth so as to obtain a glass prepreg sheet having a thickness of about 200 microns. The prepreg sheet thus obtained was irradiated with ultraviolet light for about one minutes, said ultraviolet light being emitted from a high pressure mercury lamp of 2 KW, followed by applying a heat treatment at 150° C. for 10 minutes so as to cure the resin composition and, thus, to obtain a composite material.

The tensile strength as a mechanical strength of the composite material thus obtained was found to be 91 kg/mm$^2$.

The result of the test noted above indicates that, in the composite material of the present invention, the matrix can be cured at a lower temperature and in a short time even where light irradiation is employed for curing the matrix resin, compared with the control case, and that the composite material after the curing treatment exhibits excellent mechanical properties.

A steam pressure treatment as in Examples 8 to 11 was also applied to the composite material formed in Example 12 so as to measure the volume resistivity. The reduction in the volume resistivity from the initial value was found to be only about 3% in the composite material of Example 12. It follows that the composite material of the present invention, in which light irradiation is employed for curing the matrix resin, exhibits excellent curing characteristics, mechanical properties and electrical properties, compared with the control case.

EXAMPLES 13 TO 16

Bundles of carbon fibers (PAN-series carbon fiber), each bundle comprising 1000 to 3000 carbon fibers and each fiber having a diameter of 7 microns, were arranged in one direction in a manner to form a sheet so as to form sheet-like reinforcements used in each of Examples 13 to 24 and Controls 3 to 6. The reinforcement thus formed was found to have a tensile modulus of 29 t./mm$^2$.

On the other hand, epoxy resin compositions of formulations shown in Table 4 were prepared by using "Epikote 828" manufactured by Shell Chemical Co., Ltd., "Sumiepoxy ELM" (trade name of an epoxy resin manufactured by Sumitomo Chemical Co., Ltd.), as compounds having at least one epoxy group, diaminodiphenylsulfone and/or bisphenol A as a compound having an active hydrogen, diphenyldiethoxysilane as a silicon compound, tris(ethylacetoacetato)aluminum as an organometallic compound, a silica powder having an average diameter of 1 micron as a powdery and granular material, and methyl ethyl ketone as a diluent. The amounts of these components are shown in Table 4.

In the next step, the sheet-like reinforcement was impregnated or coated with the epoxy resin composition noted above, followed by putting the impregnated or coated sheet to air-drying and subsequently applying a heat treatment at about 40° to 70° C. for 10 minutes to the dried sheet so as to obtain a prepreg sheet. The prepreg sheet thus obtained was cut into small pieces of a desired shape, followed by laminating 16 cut pieces of the prepreg sheet one upon the other. The cut pieces were laminated such that the carbon fibers in these laminated cut pieces were arranged in the same direction. Under this condition, the laminate structure was disposed between a pair of stainless steel plates each having a thickness of 2 mm. Further, the resultant structure was housed in a vacuum forming bag. The bag was then put in an autoclave and heated at 150° to 170° C. for a predetermined time so as to cure the resin composition within the laminate structure and, thus, to obtain an epoxy resin-based composite material of the present invention.

The composite material thus obtained was tested for the tensile strength and interlaminar fracture toughness, that is, fracture toughness between adjacent layers, with the results as shown in Table 4.

CONTROLS 3 AND 4

Epoxy resin compositions for Controls 3 and 4 were prepared as shown in Table 4. It should be noted that a silicon compound, an organometallic compound and a powdery and granular material were not contained in the resin compositions for these control cases. Epoxy resin-based composite materials were formed as in Examples 13 to 16 using the epoxy resin compositions shown in Table 4.

The composite material thus obtained was tested for the tensile strength and interlaminar fracture toughness, with the results as shown in Table 4.

TABLE 4

|  | Examples | | | | Controls | |
| --- | --- | --- | --- | --- | --- | --- |
|  | 13 | 14 | 15 | 16 | 3 | 4 |
| Epikote 828 #1 | 24.0 | | | | | |
| Sumiepoxy ELM120 #1 | | 22.7 | 17.0 | 14.0 | 44.7 | 44.7 |
| Diaminodiphenyl sulfone #2 | 10.4 | 7.45 | 8.0 | 6.5 | 20.3 | 20.3 |
| Bisphenol A #2 | | 4.45 | | | | |
| Diphenyldiethoxysilane #3 | 0.3 | 0.4 | 0.1 | 0.1 | | |
| Tris(ethylaceto acetato) aluminum #4 | 0.3 | 0.4 | 0.1 | 0.1 | | |
| Silica #5 | 15.0 | 14.6 | 14.8 | 19.3 | | |
| Methyl ethyl ketone (diluent) | 50.0 | 50.0 | 60.0 | 60.0 | 35.0 | 35.0 |
| Curing Condition | | | | | | |
| 150° C. × (hour) | 2.5 | 2.5 | 2.5 | 2.5 | 2.5 | |
| 170° C. × (hour) | | | | | | 2.5 |
| Tensile strength (Kgf/mm$^2$) | 126 | 127 | 131 | 130 | 109 | 124 |
| Interlaminar fracture toughness #6 (Mpa$\sqrt{m}$) | 2.1 | 2.2 | 2.3 | 2.5 | 1.2 | 1.8 |

Note:
1 Epoxy resin, i.e., compound having at least one epoxy group
2 Compound having active hydrogen
3 Silicon compound
4 Organometallic compound
5 Powdery and granular material
6 Fracture toughness between adjacent layers As apparent from the results shown in Table 4, the matrix resin, i.e., epoxy resin composition, used in the composite material of the present invention can be cured under a lower temperature and in a short time, compared with the control case. In addition, the epoxy resin-based composite material of the present invention exhibits excellent mechanical properties, particularly the interlaminar fracture toughness, particularly where the epoxy resin composition acting as a matrix contains a powdery and granular material.

EXAMPLE 17

An epoxy resin-based composite material was formed as in Example 14, except that a carbon powder having an average particle diameter of 3 microns was used as a powdery and granular material in the step of preparing an epoxy resin composition.

The resultant composite material was found to exhibit a tensile strength of 126 kgf/mm$^2$ and an interlaminar fracture toughness of 2.3 MPa$\sqrt{m}$, when measured as in Example 14.

EXAMPLE 18

An epoxy resin-based composite material was formed as in Example 15, except that a carbon powder having an average particle diameter of 3 microns was used as a powdery and granular material in the step of preparing an epoxy resin composition.

The resultant composite material was found to exhibit a tensile strength of 129 kgf/mm$^2$ and an interlaminar fracture toughness of 2.4 MPa$\sqrt{m}$, when measured as in Example 15.

Further, three prepreg sheets obtained during the process of forming the composite material employed in Example 18 were laminated one upon the other such that the direction of arrangement of the carbon fibers in the central prepreg sheet made an angle of 60° with the direction of arrangement of the carbon fibers in each of the upper and lower prepreg sheets. The laminate structure thus obtained was subjected to a heat treatment under the conditions as in Examples 13 to 16 so as to cure the resin composition constructing the prepreg sheets and, thus, to obtain a face material having a thickness of 210 microns. An aluminum honeycomb was put between upper and lower face materials, and bonded to the materials so as to form a panel having the honeycomb sandwich structure. It has been found that defects are unlikely to be generated in the panel thus formed even if an impact is given to the panel.

EXAMPLES 19 TO 22

Epoxy resin compositions shown in Table 5 were prepared by using "Epikote 828" manufactured by Shell Chemical Co., Ltd., "Sumiepoxy ELM" (trade name of an epoxy resin manufactured by Sumitomo Chemical Co., Ltd., as compounds having at least one epoxy group, diaminodiphenyl sulfone as a compound having an active hydrogen, diphenyldiethoxysilane as a silicon compound, tris(ethylacetoacetato)aluminum as an organometallic compound, a silica powder having an average diameter of 1 micron as a powdery and granular material, methyl ethyl ketone as a diluent, and "Mild Fiber" (trade name of a short fiber manufactured by Asahi Fiber Glass Co., Ltd.) as a short fiber. The amounts of these components are shown in Table 5.

Then, epoxy resin-based composite materials of the present invention were formed as in Examples 13 to 16 by using the epoxy resin compositions described above.

The composite material thus obtained was tested for the tensile strength and interlaminar fracture toughness, with the results as shown in Table 5.

CONTROLS 5 AND 6

Epoxy resin compositions for Controls 5 and 6 were prepared as shown in Table 5. It should be noted that a silicon compound, an organometallic compound, a powdery and granular material, and a short fiber were not contained in the resin compositions for these control cases. Epoxy resin-based composite materials were formed as in Examples 13 to 16 using the epoxy resin compositions shown in Table 5.

The composite material thus obtained was tested for the tensile strength and interlaminar fracture toughness, with the results as shown in Table 5.

TABLE 5

|  | Examples | | | | Controls | |
| --- | --- | --- | --- | --- | --- | --- |
|  | 19 | 20 | 21 | 22 | 5 | 6 |
| Epikote 828 #1 | 23.7 | | | | | |
| Sumiepoxy ELM120 #1 | | 22.7 | 16.8 | 14.1 | 44.7 | 44.7 |
| Diaminodiphenyl sulfone #2 | 10.0 | 10.3 | 7.7 | 6.4 | 20.3 | 20.3 |
| Diphenyldiethoxysilane #3 | 0.3 | 0.4 | 0.1 | 0.1 | | |
| Tris(ethylacetoacetato) aluminum #4 | 0.3 | 0.4 | 0.1 | 0.1 | | |
| Silica #5 | 10.8 | 11.2 | 11.5 | 16.1 | | |
| Mild Fiber #6 | 4.9 | 5.0 | 3.8 | 3.2 | | |
| Methyl ethyl ketone (diluent) | 50.0 | 50.0 | 60.0 | 60.0 | 35.0 | 35.0 |
| Curing Condition | | | | | | |
| 150° C. × (hour) | 2 | 2 | 2 | 2 | 2 | |
| 170° C. × (hour) | | | | | | 2 |
| Tensile strength (Kgf/mm$^2$) | 125 | 127 | 130 | 129 | 107 | 123 |
| Interlaminar fracture toughness (MPa$\sqrt{}$m) #7 | 2.2 | 2.4 | 2.6 | 2.6 | 1.4 | 1.8 |

Note:
1 Epoxy resin, i.e., compound having at least one epoxy group
2 Compound having active hydrogen
3 Silicon compound
4 Organometallic compound
5 Powdery and granular material
6 Short fiber
7 Fracture toughness between adjacent layers As apparent from the results shown in Table 5, the epoxy resin-based composite material of the present invention exhibits excellent curing characteristics of the matrix and mechanical properties. The experimental data shown in Table 5 also suggest that the short fiber addition to the matrix permits further improving the mechanical strength of the composite material.

EXAMPLE 23

An epoxy resin-based composite material of the present invention was formed as in Example 20, except that a carbon fiber having an average length of 70 microns, which were manufactured by Osaka Gas Co., Ltd., were used in place of the Mild Fiber, i.e., a short fiber, used in Example 20 in preparing an epoxy resin composition.

The composite material thus formed was found to have a tensile strength of 128 kgf/mm$^2$ and an interlaminar fracture toughness of 2.5 MPa$\sqrt{}$m.

EXAMPLE 24

An epoxy resin-based composite material of the present invention was formed as in Example 21, except that a carbon fiber having an average length of 70 microns, which were manufactured by Osaka Gas Co., Ltd., were used in place of the Mild Fiber, i.e., a short fiber, used in Example 21 in preparing an epoxy resin composition.

The composite material thus formed was found to have a tensile strength of 126 kgf/mm$^2$ and an interlaminar fracture toughness of 2.3 MPa$\sqrt{}$m.

Further, three prepreg sheets obtained during the process of forming the composite material employed in Example 24 were laminated one upon the other such that the direction of arrangement of the carbon fibers in the central prepreg sheet made an angle of 60° with the direction of arrangement of the carbon fibers in each of the upper and lower prepreg sheets. The laminate structure thus obtained was subjected to a heat treatment under the conditions as in Examples 13 to 16 so as to cure the resin composition constructing in the prepreg sheets and, thus, to obtain a face material having a thickness of 250 microns. An aluminum honeycomb was put between upper and lower face materials, and bonded to the materials so as to form a panel having the honeycomb sandwich structure. It has been found that defects are unlikely to be generated in the panel thus formed even if an impact is given to the panel.

EXAMPLES 25 TO 28

Bundles of carbon fibers each comprising 1000 to 3000 carbon fibers and each carbon fiber having a diameter of 7 microns were arranged in one direction in a manner to form a sheet so as to prepare a sheet-like reinforcement, which was commonly used in Examples 25 to 33 and in Controls 7 to 10. The tensile modulus of the sheet-like reinforcement was found to be 29 t./mm$^2$.

On the other hand, resin compositions were prepared by using as a matrix resin a thermosetting resin such as an epoxy resin, a maleimide resin, an oxazoline resin or a cyanic acid ester resin, a silica powder having an average particle diameter of 1 micron as a powdery and granular material, and methyl ethyl ketone as a diluent. The mixing ratio of these components is shown in Table 6. To be more specific, the epoxy resin used was "Sumiepoxy resin ELM-120" (trade name of an epoxy resin manufactured by Sumitomo Chemical Co., Ltd., and containing an aromatic diamine as a curing agent). The maleimide resin used was diphenylmethanebismaleimide containing diaminodiphenylmethane as a curing agent. The oxazoline resin used was 2,2'-(1,3-phenylene)-bis(2-oxazoline), which is available on the market with a trade name of "CP Resin" in which a carboxylic acid compound is added. Further, the cyanic acid ester resin used was polycyanate available on the market with a trade name of "RS-3".

In the next step, each of the sheet-like reinforcement was impregnated with the resin composition described above, followed by air-drying and subsequently heating the impregnated base material at 40° to 70° C. for 10 minutes so as to form a prepreg sheet. The prepreg sheet thus prepared was cut into small pieces of a desired shape, followed by laminating a plurality of cut pieces of the prepreg sheet one upon the other such that the carbon fibers in each of the laminated cut pieces were aligned in the same direction throughout the laminate structure. The laminate structure thus formed was held between a pair of stainless steel plates each having a thickness of 2 mm, and the resultant structure was housed in a vacuum forming bag. The bag was then put in an autoclave and heated at 170° C. so as to cure the resin composition and, thus, to obtain a composite material.

The composite material thus obtained was tested for the tensile strength and the interlaminar fracture toughness, that is, the fracture toughness between adjacent layers, with the result as shown in Table 6.

CONTROLS 7 AND 8

Resin compositions as shown in Table 6 were prepared as control cases. As seen from Table 6, a powdery and granular material was not contained in the resin compositions for these control cases. Then, composite materials were formed as in Examples 25 to 28 by using the resin compositions shown in Table 6.

The composite materials thus obtained were tested for the tensile strength and the interlaminar fracture toughness, with the result as shown in Table 6.

TABLE 6

|  | Examples | | | | Controls | |
| --- | --- | --- | --- | --- | --- | --- |
|  | 25 | 26 | 27 | 28 | 7 | 8 |
| Epoxy resin #1 | 25 |  |  |  | 50 |  |
| Maleimide resin #1 |  | 25 |  |  |  | 50 |
| Oxazoline resin #1 |  |  | 25 |  |  |  |
| Cyanic acid ester resin #1 |  |  |  | 25 |  |  |
| Silica (powdery and granular material) | 25 | 25 | 25 | 25 |  |  |
| Methyl ethyl ketone (diluent) | 50 | 50 | 50 | 50 | 50 | 50 |
| Tensile strength (Kgf/mm$^2$) | 127 | 121 | 125 | 124 | 121 | 105 |
| Interlaminar fracture toughness (Mpa$\sqrt{m}$) #2 | 2.3 | 1.9 | 2.2 | 2.0 | 1.6 | 1.2 |

Note:
1 Matrix resin
2 Fracture toughness between adjacent layers

As apparent from the results shown in Table 6, the composite material of the present invention, in which a powdery and granular material is contained in the matrix, exhibits improved mechanical properties, compared with the control cases.

EXAMPLES 29 TO 32

Resin compositions as shown in Table 7 were prepared by using as a matrix resin a thermosetting resin such as an epoxy resin, a maleimide resin, an oxazoline resin or a cyanic acid ester resin as in Examples 25 to 28, a silica powder having an average particle diameter of one micron as a powdery and granular material, methyl ethyl ketone as a diluent, and "Mild Fiber" (trade name of short fibers manufactured by Asahi Fiber Glass Co., Ltd., having an average length of 50 to 60 microns) as a short fiber. The mixing amounts of these components of the resin composition are shown in Table 7.

Then, composite materials were formed as in Examples 25 to 28 by using the resin compositions described above.

The composite materials thus formed were tested for the tensile strength and the interlaminar fracture toughness, with the results as shown in Table 7.

CONTROLS 9 AND 10

Resin compositions as shown in Table 7 were prepared as control cases. As seen from Table 7, a powdery and granular material and a short fiber were not contained in the resin compositions for these control cases. Then, composite materials were formed as in Examples 25 to 28 by using the resin compositions shown in Table 7.

The composite materials thus obtained were tested for the tensile strength and the interlayer fracture toughness, with the result as shown in Table 7.

TABLE 7

|  | Examples | | | | Controls | |
| --- | --- | --- | --- | --- | --- | --- |
|  | 29 | 30 | 31 | 32 | 9 | 10 |
| Epoxy resin #1 | 25 |  |  |  | 50 |  |
| Maleimide resin #1 |  | 25 |  |  |  | 50 |
| Oxazoline resin #1 |  |  | 25 |  |  |  |
| Cyanic acid ester resin #1 |  |  |  | 25 |  |  |
| Silica (powdery and granular material) | 12.5 | 12.5 | 12.5 | 12.5 |  |  |
| Mild Fiber (shoft fiber) | 12.5 | 12.5 | 12.5 | 12.5 |  |  |
| Methyl ethyl ketone (diluent) | 50 | 50 | 50 | 50 | 50 | 50 |
| Tensile strength (kgf/mm$^2$) | 128 | 122 | 127 | 124 | 121 | 105 |
| Interlaminar fracture toughness (Mpa$\sqrt{m}$) #2 | 2.5 | 2.0 | 2.4 | 2.2 | 1.6 | 1.2 |

Note:
1 matrix resin
2 Fracture toughness between adjacent layers

As apparent from the results shown in Table 7, the composite material of the present invention, in which a powdery and granular material is contained in the matrix, exhibits improved mechanical properties, compared with the control cases. Table 6 also suggests that the use of the short fiber permits further improving the mechanical strength of the composite material.

EXAMPLE 33

A resin composition was prepared by mixing 70 parts by weight of polyether-ether ketone (available on the market under the trade name of PEEK) as a matrix resin, and 30 parts by weight of a silica powder having an average particle diameter of one micron as a powdery and granular material, together with methyl ethyl ketone used as a diluent.

In the next step, the sheet-like reinforcement used in Examples 25 to 29 was impregnated with the resin composition described above, followed by heating the sheet-like reinforcement so as to cure the resin composition used for impregnating the base material and, thus, to obtain a face material having a thickness of 270 mm. Then, an aluminum honeycomb was held between upper and lower face materials and bonded to these upper and lower face materials so as to form a panel having the honeycomb sandwich structure. It has been found that defects are unlikely to be generated in the panel thus formed upon receipt of an impact.

As described above in detail, the present invention provides a resin-based composite material, in which the matrix resin can be cured promptly and easily. The composite material of the present invention exhibits excellent properties in terms of the mechanical strength, heat resistance, corrosion resistance and electrical properties.

It should be noted in particular that, where the composite material of the present invention is in the form a laminate structure comprising a sheet-like reinforcement formed of a fibrous material, the composite material is enabled to exhibit markedly improved impact strength and crack resistance in a direction perpendicular to the arranging direction of the fibers in each sheet-like reinforcement and in the thickness direction of the laminate structure. It follows that the present invention is of high industrial value.

What is claimed is:

1. An epoxy resin-based composite material formed by coating or impregnating a reinforcement sheet with an epoxy resin composition, followed by curing the epoxy resin composition, said epoxy resin composition comprising:
   a compound having at least one epoxy group;
   a curing agent for the compound having at least one epoxy group, said curing agent being selected from the group consisting of a phenolic compound, an amine compound, an imide compound, an amide compound, a barbituric acid compound, a cyanuric acid compound, a thiophenolic compound and a carboxylic compound;
   a silicon compound having or generating a hydroxyl group bonded to a silicon atom;
   an organometallic compound; and
   a powdery material which increases the mechanical strength of said composite material.

2. The epoxy resin-based composite material according to claim 1, wherein said curing agent for the compound having at least one epoxy group is a compound having an aromatic primary amino group or an aromatic secondary amino group.

3. The epoxy resin-based composite material according to claim 1, wherein said curing agent for the compound having at least one epoxy group is a phenolic compound.

4. The epoxy resin-based composite material according to claim 1, wherein said organometallic compound is an organoaluminum compound.

5. The epoxy resin-based composite material according to claim 1, wherein said epoxy resin composition is curable upon light irradiation and/or heating.

6. The epoxy resin-based composite material according to claim 1, wherein said epoxy resin composition further comprises a fiber.

7. The epoxy resin-based composite material according to claim 6, wherein said curing agent for the compound having at least one epoxy group is a compound having an aromatic primary amino group or an aromatic secondary amino group.

8. The epoxy resin-based composite material according to claim 6, wherein said curing agent for the compound having at least one epoxy group is a phenolic compound.

9. The epoxy resin-based composite material according to claim 6, wherein said organometallic compound is an organoaluminum compound.

10. The epoxy resin-based composite material according to claim 6, wherein said epoxy resin composition is curable upon light irradiation and/or heating.

11. The epoxy resin-based composite material according to claim 6, wherein the fiber is selected from the group consisting of glass fiber, alumina fiber, boron fiber, silicon carbide fiber, metal whisker, polyamide fiber and polybenzimidazolefiber.

12. The epoxy resin-based composite material according to claim 1, wherein the reinforcement sheet comprises an inorganic or organic fibrous material.

13. The epoxy resin-based composite material according to claim 12, wherein the sheet-like reinforcement sheet comprises a carbon fiber.

14. The epoxy resin-based composite material according to claim 1, wherein the powdery material is selected from the group consisting of silica, alumina, talc, calcium carbonate, barium sulfate, titanium dioxide, silicon nitride, silicone carbide, boron nitride, graphite, polyimide, polysulfone and phenoxy.

15. An epoxy resin-based composite material comprising a plurality of reinforcement sheets coated or impregnated with an epoxy resin composition, wherein said composite material is formed by the steps of:
   coating or impregnating a reinforcement sheet with an epoxy resin composition which contains;
   a compound having at least one epoxy group,
   a curing agent for the compound having at least one epoxy group, said curing agent being selected from the group consisting of a phenolic compound, an amine compound, an imide compound, an amide compound, a barbituric acid compound, a cyanuric acid compound, a thiophenolic compound and a carboxylic compound;
   a silicon compound having or generating a hydroxyl group bonded to a silicon atom;
   an organometallic compound; and
   a powdery material Which increases the mechanical strength of said composite material;
   slightly heating the reinforcement coated or impregnated with the epoxy resin composition to form a prepreg sheet;
   laminating a plurality of the prepreg sheets; and
   curing the epoxy resin composition.

16. The epoxy resin-based composite material according to claim 15, wherein said epoxy resin composition further comprises a fiber.

* * * * *

UNITED STATES PATENT AND TRADEMARK OFFICE
CERTIFICATE OF CORRECTION

PATENT NO. : 5,439,746
DATED : August 8, 1995
INVENTOR(S) : Shuichi SUZUKI

It is certified that error appears in the above-indentified patent and that said Letters Patent is hereby corrected as shown below:

On the title page, Item [54] and Column 1, Line 1, the title should read:

--EPOXY RESIN-BASED COMPOSITE MATERIAL--

Signed and Sealed this

Thirty-first Day of October 1995

Attest:

BRUCE LEHMAN

*Attesting Officer*     *Commissioner of Patents and Trademarks*